United States Patent
Chiu

(10) Patent No.: US 11,366,283 B2
(45) Date of Patent: Jun. 21, 2022

(54) LENS DRIVING DEVICE, CAMERA AND PORTABLE ELECTRONIC APPARATUS

(71) Applicant: AAC Optics Solutions Pte. Ltd., Singapore (SG)

(72) Inventor: Ching-Chung Chiu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 268 days.

(21) Appl. No.: 16/790,738

(22) Filed: Feb. 14, 2020

(65) Prior Publication Data

US 2021/0199914 A1 Jul. 1, 2021

(30) Foreign Application Priority Data

Dec. 27, 2019 (JP) .............................. JP2019-239956

(51) Int. Cl.
  *G02B 7/04* (2021.01)
  *F03G 7/06* (2006.01)
  *G02B 13/00* (2006.01)
  *H02N 10/00* (2006.01)

(52) U.S. Cl.
  CPC ............... *G02B 7/04* (2013.01); *F03G 7/065* (2013.01); *G02B 13/001* (2013.01); *H02N 10/00* (2013.01)

(58) Field of Classification Search
  CPC .......... F03G 7/065; H02N 10/00; G02B 7/04; G02B 7/02; G02B 7/00; G02B 13/001; G02B 13/00
  USPC ......................................................... 359/823
  See application file for complete search history.

(56) References Cited

U.S. PATENT DOCUMENTS

| | | | | |
|---|---|---|---|---|
| 2010/0060776 A1* | 3/2010 | Topliss | ..................... | G02B 7/08 348/340 |
| 2010/0283887 A1* | 11/2010 | Topliss | .................... | F03G 7/065 60/527 |
| 2011/0179786 A1* | 7/2011 | Topliss | ..................... | G03B 3/10 60/527 |
| 2011/0279916 A1* | 11/2011 | Brown | ...................... | G02B 7/08 359/823 |
| 2018/0136433 A1* | 5/2018 | Kuo | .......................... | G02B 7/04 |

* cited by examiner

*Primary Examiner* — William R Alexander
(74) *Attorney, Agent, or Firm* — W&G Law Group

(57) ABSTRACT

The present disclosure provides a small and well-focused lens driving device, a camera including the lens driving device, and a portable electronic apparatus. The lens driving device includes a fixing base, a cover, a lens holder, a support frame, a support member, and a shape memory alloy portion. In the lens driving device, a receiving space is defined by the fixing base and the cover. The lens holder configured to receive a lens, as well as the support frame, the support member, and the shape memory alloy portion that cause the lens holder to move freely in an optical axis direction are provided in the receiving space. The shape memory alloy portion has a shape memory alloy and a crimping lug, and the shape memory alloy portion is provided on the fixing base and the support frame to cause the lens holder to move freely in the optical axis direction.

16 Claims, 5 Drawing Sheets

LENS DRIVING DEVICE, CAMERA AND PORTABLE ELECTRONIC APPARATUS

TECHNICAL FIELD

The present disclosure relates to the field of lens driving devices air cameras, and particularly, relates to a lens driving device having a function of driving a large lens, a camera including the lens driving device, and a portable electronic apparatus.

BACKGROUND

With the rapid development of camera technology, lens driving devices are widely applied in a large number of camera devices. Various portable electronic apparatuses (such as mobile phones, tablet computers, etc.) using the lens driving devices are particularly popular among the consumers.

A basic requirement on many mobile devices such as mobile phones is to have digital camera functions, which benefits from miniaturization of the lens driving devices. A shape memory alloy portion is provided for the miniaturization of the lens driving devices. In order to provide autofocus or zoom, a lens is equipped and a lens is driven to move back and forth along an image acquisition optical axis.

However, a shape memory alloy structure in the existing lens driving devices generally has insufficient balance and poor hysteresis. Therefore, it is urgent to solve the problem of improving the overall balance of the lens driving device through modifications of the shape memory alloy and a slope of the structure.

SUMMARY

Problems to be Solved by the Present Application

A size of the lens is increased with an increase in a size of a pixel camera sensor. However, with the miniaturization of electronic apparatuses, the lens driving device is also required to be miniaturized. Comparing with the large lens, if the lens driving device is miniaturized, then thrust and stability of the lens driving may decrease. The present disclosure provides a new lens driving device in order to solve the problem of the decrease of the stability.

Technical Solutions to Solve the Problems

An object of the present disclosure is achieved in a following manner. In the following description, the reference signs shown in the drawings are in parentheses to help the understanding. However, the various constituent elements of the present disclosure are not limited to these reference signs and should be interpreted broadly to a technically understandable range by those skilled in the art.

The present disclosure provides a lens driving device, configured to move a lens in a direction parallel to an optical axis. The lens driving device includes a fixing base, a cover, a lens holder, a support frame, a support member, and a shape memory alloy portion. In the lens driving device, a receiving space is defined by the fixing base and the cover. The lens holder, the support frame, the support member, and the shape memory alloy portion are received in the receiving space. The lens holder is configured to receive the lens. The support frame, the support member, and the shape memory alloy portion are used to cause the lens holder to move freely in an optical axis direction. The shape memory alloy portion comprises at least one shape memory alloy and crimping lugs, and the shape memory alloy portion is provided on the fixing base and the support frame to cause the lens holder to move freely in the optical axis direction.

Preferably, the support member is a leaf spring.

Preferably, two of the crimping lugs are provided corresponding to each of the at least one shape memory alloy.

Preferably, the at least one shape memory alloy comprises at least four shape memory alloys, and the crimping lugs comprise at least eight crimping lugs.

Preferably, the lens holder has a protruding portion and a groove provided in the protruding portion, the groove has a shape matching a slope of a corresponding one of the at least one shape memory alloy such that the lens holder is moved in the direction parallel to the optical axis with an acting farce that is applied to the groove when the shape memory alloy moves.

Preferably, the slope of the corresponding one of the at least one shape memory alloy is set to be 20 to 40 degrees.

Preferably, the protruding portion includes a left protruding portion and a right protruding portion, the groove includes a first upper groove and a first lower groove that are provided on the left protruding portion, and a second upper groove and a second lower groove that are provided in the right protruding portion. The first upper groove and the first lower groove are arranged in a mutually staggered manner, and the second upper groove and the second lower groove are arranged in a mutually staggered manner.

Preferably, the mutually staggered manner is a partly staggered manner.

Preferably, the fixing base has a structure for fixing both the at least one shape memory alloy and the support member.

Preferably, the support frame has a structure for fixing both the at least one shape memory alloy and the support member.

Preferably, the support member has an energization path for the shape memory alloy portion and an energization for a magnetic detection element.

Preferably, the lens driving device, by applying a current to the support member, drives the lens holder based on an effect of a phase transition point of the shape memory alloy.

The present disclosure also provides camera device such as a camera, which includes the lens driving device described above.

Further, the present disclosure further provides a portable electronic apparatus such as a smartphone, which includes the lens driving device described above.

Effects of the Present Application

The present disclosure has following beneficial technical effects: the lens driving device of the present disclosure can achieve stable movement of the lens along the optical axis; compared with an existing shape memory alloy, a purpose of improving imbalance of a slope structure and improving instability of the lens driving can be achieved, so as improve a quality of a captured image.

DESCRIPTION OF EMBODIMENTS

Figure 1:
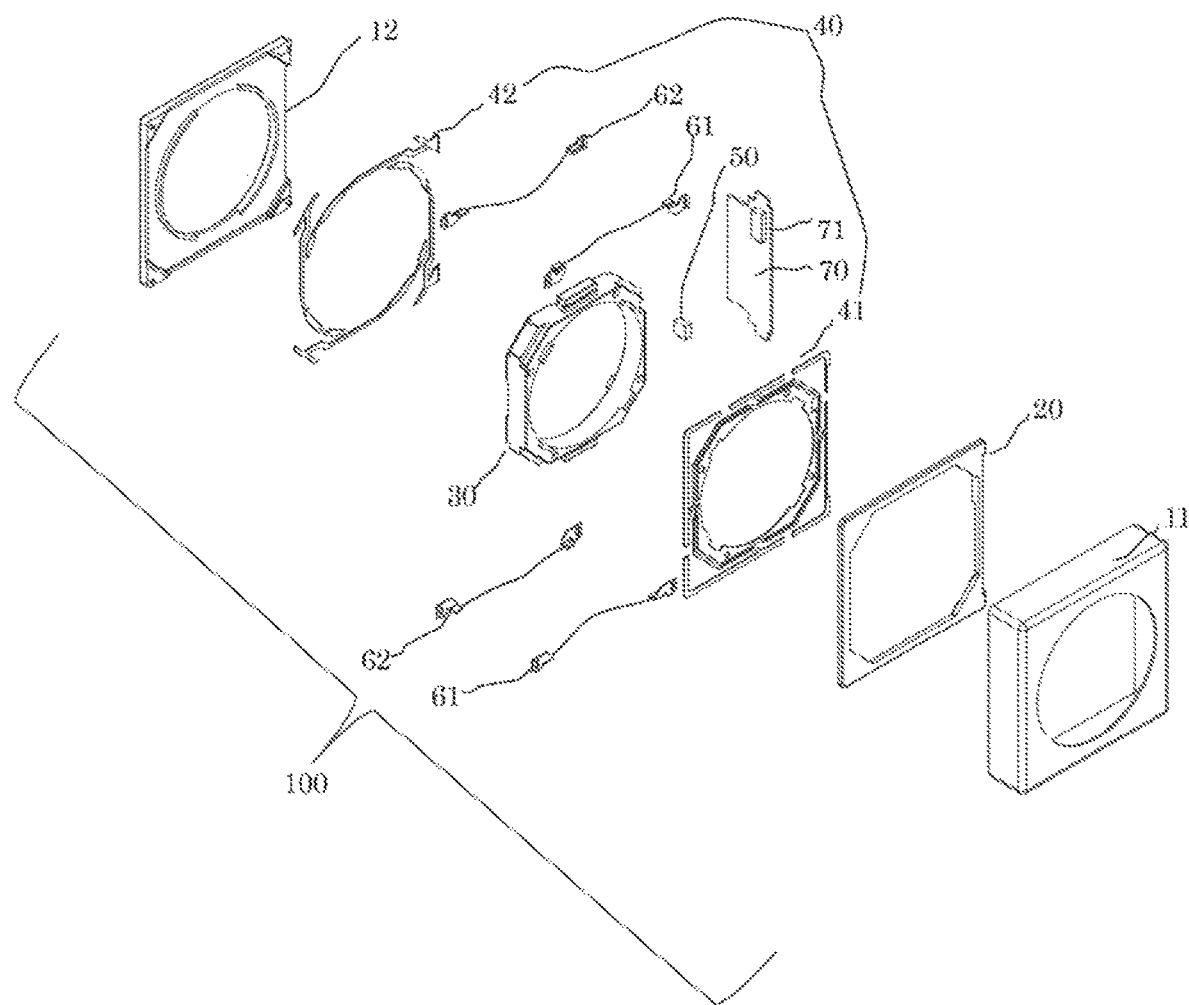
FIG. 1 is an exploded perspective view of a lens driving device of the present disclosure.
Figure 2:
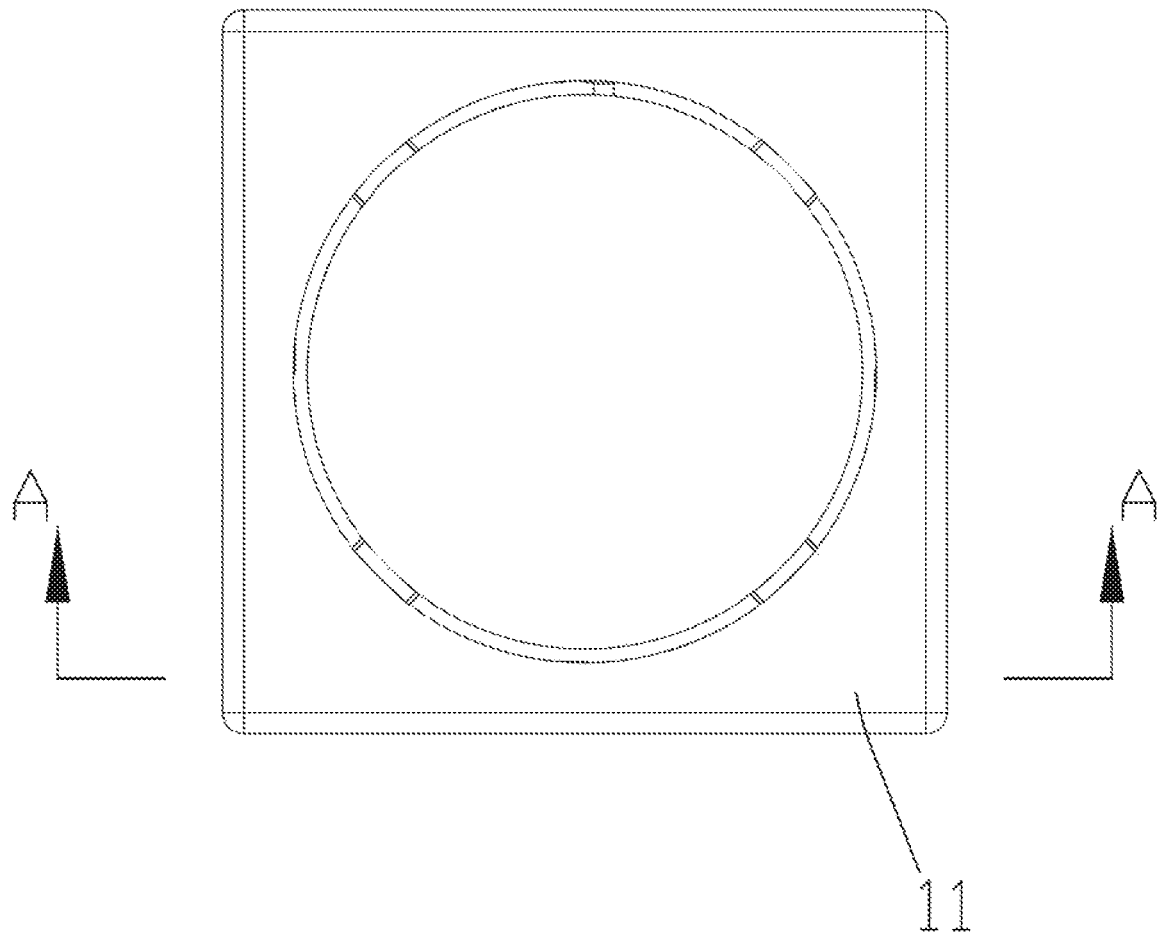
FIG. 2 is a top view of a lens driving device of the present disclosure.

Hereinafter, the present disclosure will be described in detail with reference to the drawings.

FIGS. 1 to 6 are diagrams illustrating a lens driving device 100 according to the present disclosure.

The lens driving device 100 includes a case 10, a support frame 20, a lens holder 30, a leaf spring 40, and a shape memory alloy portion 60.

The case 10 has a receiving space 13 therein. The case 10 includes: a fixing base 12, and a cover 11 that defines a receiving space 13 together with the fixing base 12. The leaf spring 40 includes an upper leaf spring 41 and a lower leaf spring 42.

The lower leaf spring 42 and a part of a crimping lug 63 are provided on the fixing base 12.

The support frame 20 is received in the receiving space 13 of the case 10. Below the support frame 20, the upper leaf spring 41 and the other part of the crimping lug 63 are provided.

Figure 3:
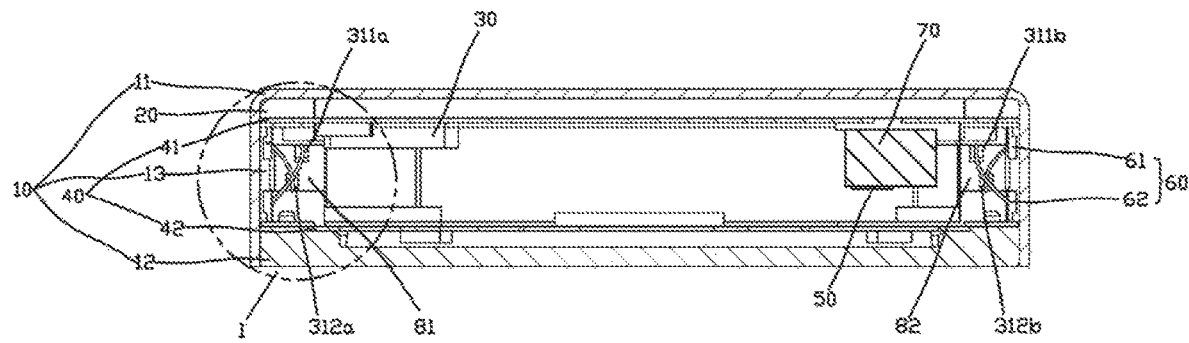
FIG. 3 is a cross-sectional view of the lens driving device of the present disclosure taken along a line A-A in FIG. 2.
Figure 4:
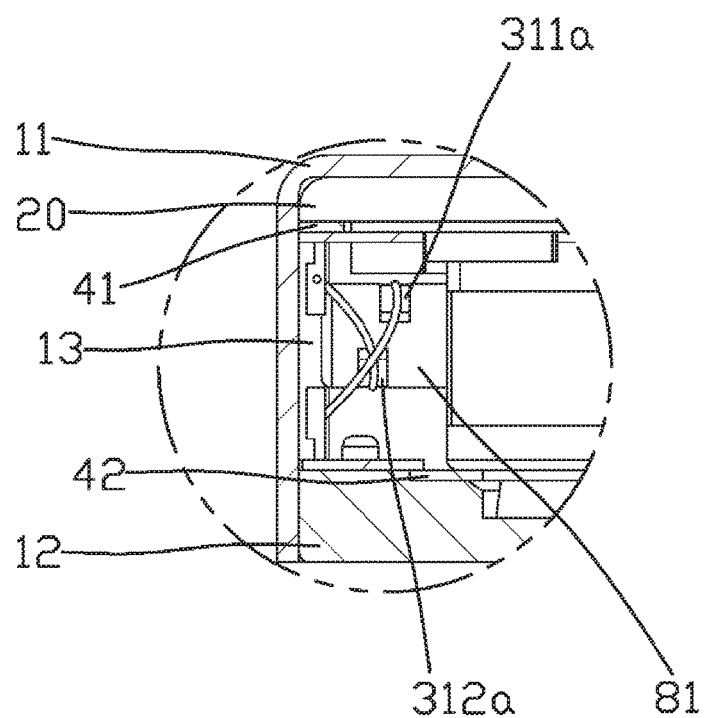
FIG. 4 is a partially enlarged view of a left side portion (I portion) of the lens driving device of FIG. 2 according to the present disclosure.
Figure 5:
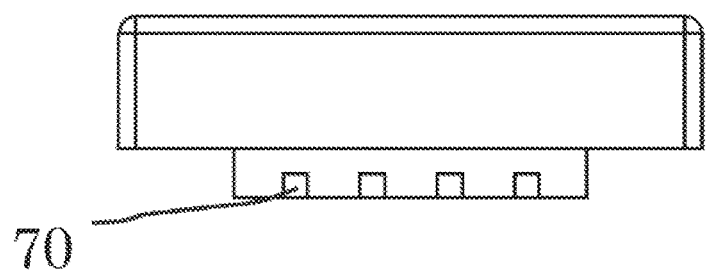
FIG. 5 is a left side view of a lens driving device of the present disclosure.
Figure 6:
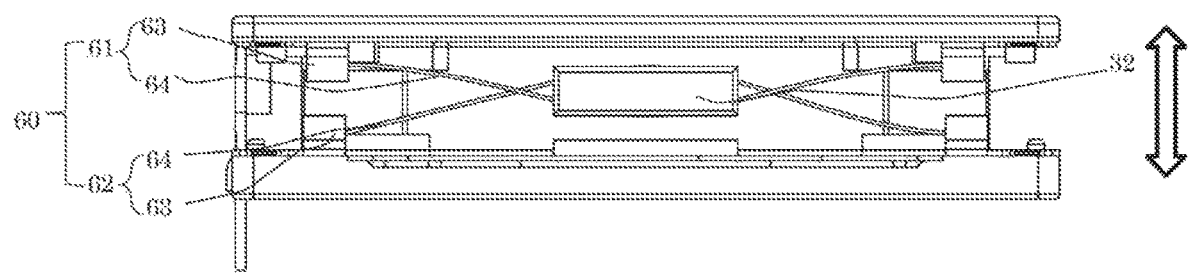
FIG. 6 is a side view of a lens driving device of the present disclosure, in which a case is removed.
Figure 7:
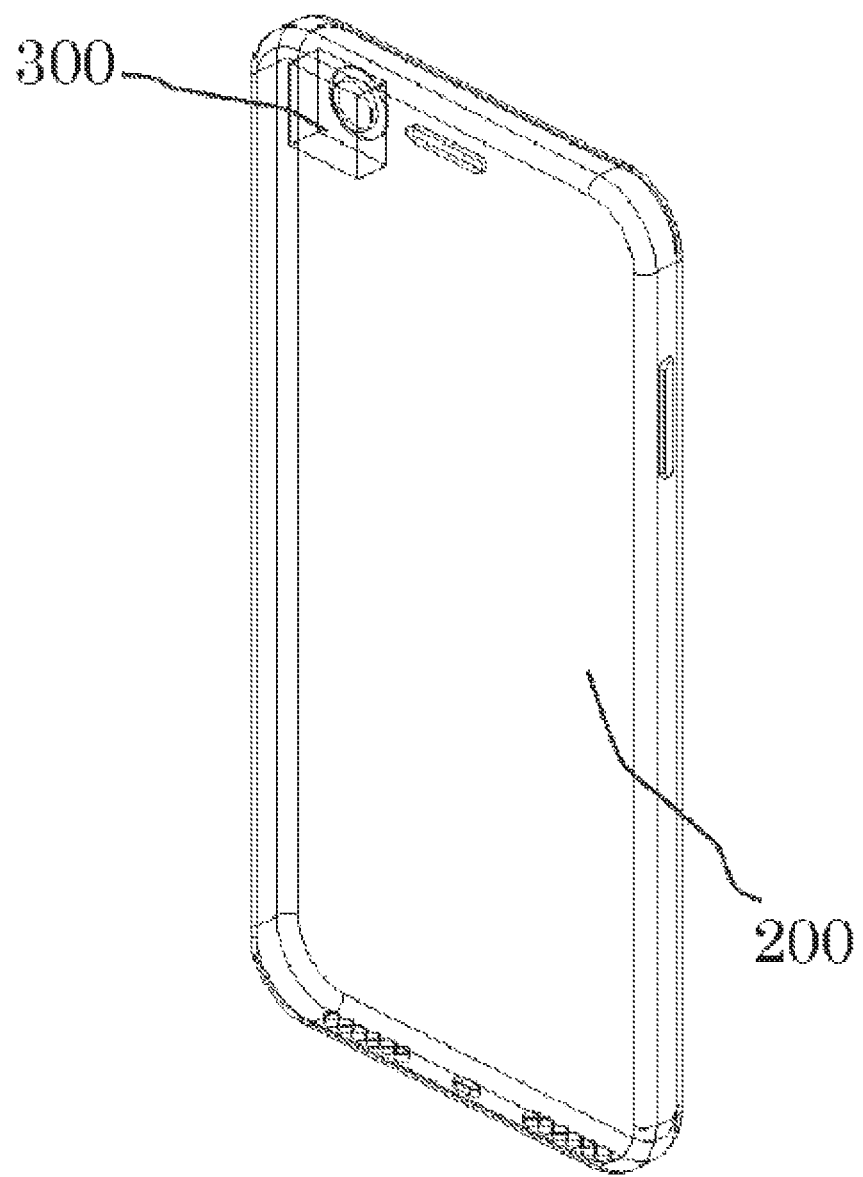
FIG. 7 is a diagram of a portable electronic apparatus (portable information terminal) including a lens driving device of the present disclosure.

The shape memory alloy portion 60 includes a first shape memory alloy portion 61 and a second shape memory alloy portion 62. Two first shape memory alloy portions 61 and two second shape memory alloy portions 62 are provided approximately center-symmetrical with respect to an optical axis of the lens, i.e., disposed at positions approximately symmetrical with respect to a center line. The first shape memory alloy portion 61 and the second shape memory alloy portion 62 each have the crimping lugs 63 and a shape memory alloy 64. For each shape memory alloy 64, two crimping lugs 63 are provided correspondingly. Preferably, at least four shape memory alloys 64 are provided between the fixing base 12 and the support frame 20, and correspondingly, at least eight crimping lugs 63 are provided. The lens holder 30 has a protruding portion 80 and a groove 31 provided in the protruding portion 60. The groove 31 has a shape matching a slope of the corresponding shape memory alloy 64 such that the lens holder 30 is moved in a direction parallel to the optical axis with an acting force applied to the groove 31 when the shape memory alloy 64 moves. That is, the shape memory alloy 64 provided in the lens holder 30 controls movement of the lens holder 30 through the groove 31 provided in the lens holder and defines a movement direction, and according to the slope of the shape memory alloy 64, the lens can be moved freely with the lens holder 30 in the direction parallel to the optical axis. The slope of the shape memory alloy refers to an angle between a connection line from a highest point of the shape memory alloy to one end of the shape memory alloy and a connection line of two ends of the shape memory alloy. Preferably, the slope of the shape memory alloy is set to be 20 to 40 degrees. With such a configuration, the acting force between the shape memory alloy 64 and the groove is moderate and not too great while ensuring the free movement of the lens holder 30 in the direction parallel to the optical axis. In this way, service lives of the lens holder 30 and the shape memory alloy 64 can be guaranteed. In addition, preferably, as shown in FIG. 3, the protruding portion 80 includes a left protruding portion 81 and a right protruding portion 82. The groove 31 includes a first upper groove 311a and a first lower groove 312a that are provided on the left protruding portion 81, as well as a second upper groove 311b and a second lower groove 312b that are provided in the right protruding portion 82. The first upper groove 311a and the first lower groove 312a are arranged in a mutually staggered manner, and the second upper groove 311b and the second lower groove 312b are arranged in a mutually staggered manner. With such an arrangement, the mutual frictions between the shape memory alloys 61 that apply forces to the respective grooves can be avoided, so as to prolong the service lives of the lens holder 30 and the shape memory alloy 64. Further preferably, the above-mentioned mutually staggered manner is not a completely staggered manner, but a partially staggered manner, which is conducive to the miniaturization of the entire device and cost saving.

The leaf spring 40 is supported towards the support frame 20 and the fixing base 12 in such a manner that the lens holder 30 can stably move in the direction parallel to the optical axis.

The upper leaf spring 41 and the lower leaf spring 42 are respectively provided on an upper surface portion and lower surface portion of the lens holder 30 along the optical axis direction of the lens.

The shape memory alloy portion 60 is provided on two sides with respect to a magnetic steel 50 corresponding to a magnetic detection element. A current is supplied via the leaf spring 40, and based on an effect of a phase transition point of the shape memory alloy 64, the lens holder 30 can move the optical axis direction of the lens, i.e., the defined movement axis direction 32, so as to perform focus.

A connecting wire 70 is connected to the leaf spring 40, and the first shape memory alloy portion 61 is connected to the corresponding upper leaf spring 41 or the corresponding lower leaf spring 42 through wire ends at both ends thereof. Similarly the second shape memory alloy portion 62 is connected to the corresponding upper leaf spring 41 or the corresponding lower leaf spring 42 through wire ends at both ends thereof. Alternatively, the magnetic detection element 71 of a driving circuit having a lens is connected to the wire end of the respective shape memory alloy portion 60 via the connecting wire 70. The magnetic detection element 71 is connected to the leaf spring 40 and may be connected to the connecting wire 70 via the leaf spring 40.

The magnetic detection element 71 having the lens driving circuit is only an example, and it can be a driving IC that also has magnetic detection. The magnetic detection element 71 having a first driving circuit detects magnetism of the corresponding magnetic steel 50 and detects a position of the lens holder 30 moving in the optical axis direction, so as to perform adjustments related to the movement of the optical axis of the lens more efficiently.

The lens driving device 100 can be applied, for example, in a camera device 300 for a portable information apparatus 200 such as a so-called smartphone, a feature phone or a tablet device.

The lens driving device 100 of the present disclosure can achieve stable movement of the optical axis of the lens. Therefore, compared with an existing shape memory alloy, a purpose of improving imbalance of a slope structure and improving instability of the lens driving can be achieved, and a quality of a captured image can be improved.

The above are only the preferred embodiments of the present disclosure, and a protection scope of the present disclosure is not limited to the above embodiments. Equivalent modifications or deformations made by those skilled in the art based on disclosed content of the present disclosure are all included in the scope defined by the pending claims.

REFERENCE SIGNS

10 . . . case
11 . . . cover
12 . . . fixing base
13 . . . receiving space
20 . . . support frame
30 . . . lens holder
31 . . . groove provided in lens holder and configured to define movement direction
311a . . . first upper groove
312a . . . first lower groove
311b . . . second upper groove
312b . . . second lower groove
32 . . . defined movement axis direction
40 . . . leaf spring (support member)
41 . . . upper leaf spring
42 . . . lower leaf spring
50 . . . magnetic steel corresponding to magnetic detection element
60 . . . shape memory alloy portion
61 . . . first shape memory alloy portion
62 . . . second shape memory alloy portion
63 . . . crimping lug
64 . . . shape memory alloy
70 . . . connecting wire
71 . . . magnetic detection element having driving circuit
80 . . . protruding portion
81 . . . left protruding portion
82 . . . right protruding portion
100 . . . lens driving device
200 . . . portable information apparatus
300 . . . camera device

What is claimed is:

1. A lens driving device, configured to drive a lens to move in a direction parallel to an optical axis, the lens driving device comprising:
    a fixing base;
    a cover;
    a lens holder;
    a support frame;
    a support member; and
    a shape memory alloy portion,
    wherein the fixing base and the cover define a receiving space in the lens driving device,
    the lens holder, the support frame, the support member, and the shape memory alloy portion are received in the receiving space; the lens holder is configured to receive the lens; and the support frame, the support member, and the shape memory alloy portion are used to cause the lens holder to move freely in the direction parallel to the optical axis, and
    the shape memory alloy portion comprises at least one shape memory alloy and crimping lugs, and the shape memory alloy portion is provided on the fixing base and the support frame in such a manner that the lens holder moves freely in the direction parallel to the optical axis;
    wherein the fixing base has a structure for fixing both the at least one shape memory alloy and the support member.

2. The lens driving device as described in claim 1, wherein the support member is a leaf spring.

3. The lens driving device as described in claim 1, wherein two of the crimping lugs are provided correspondingly to each of the at least one shape memory alloy.

4. The lens driving device as described in claim 2, wherein two of the crimping lugs are provided correspondingly to each of the at least one shape memory alloy.

5. The lens driving device as described in claim 1, wherein the at least one shape memory alloy comprises at least four shape memory alloys, and the crimping lugs comprise at least eight crimping lugs.

6. The lens driving device as described in claim 3 wherein the at least one shape memory alloy comprises at least four shape memory alloys, and the crimping lugs comprise at least eight crimping lugs.

7. The lens driving device as described in claim 1, wherein the lens holder comprises a protruding portion and a groove provided in the protruding portion, and the groove has a shape matching a slope of a corresponding one of the at least one shape memory alloy, such that the lens holder moves in the direction parallel to the optical axis under an acting force that is applied to the groove when the shape memory alloy moves.

8. The lens driving device as described in claim 7, wherein the slope of the corresponding one of the at least one shape memory alloy is set to be 20 degrees to 40 degrees.

9. The lens driving device as described in claim 7, wherein the protruding portion comprises a left protruding portion and a right protruding portion, the groove comprises a first upper groove and a first lower groove that are provided in the left protruding portion, and a second upper groove and a second lower groove that are provided in the right protruding portion, and
    wherein the first upper groove and the first lower groove are arranged in a mutually staggered manner, and the second upper groove and the second lower groove are arranged in the mutually staggered manner.

10. The lens driving device as described in claim 9, wherein the mutually staggered manner is a partly staggered manner.

11. The lens driving device as described in claim 1, wherein the support frame has a structure for fixing both the at least one shape memory alloy and the support member.

12. The lens driving device as described in claim 1, wherein the support member has an energization path for the shape memory alloy portion and an energization for a magnetic detection element.

13. The lens driving device as described in claim 2, wherein the support member has an energization path for the shape memory alloy portion and an energization for a magnetic detection element.

14. The lens driving device as described in claim 1, wherein the lens driving device, by applying a current to the support member, drives the lens holder based on an effect of a phase transition point of the at least one shape memory alloy.

15. A camera, comprising the lens driving device as described in claim 1.

16. A portable electronic apparatus, comprising the camera as described in claim 15.

* * * * *